Nov. 18, 1941.  A. DUWE  2,263,264
MAGNETIC SYSTEM FOR MEASURING DEVICES
Filed Jan. 4, 1939   2 Sheets-Sheet 1
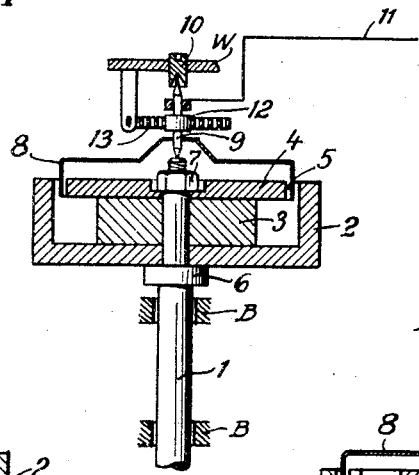
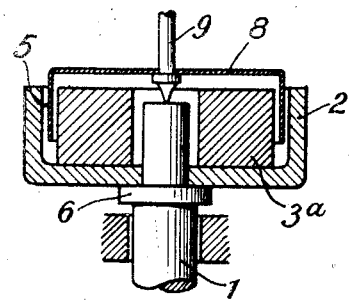
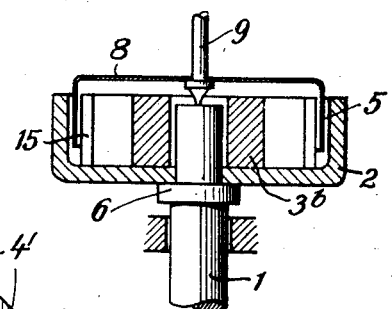
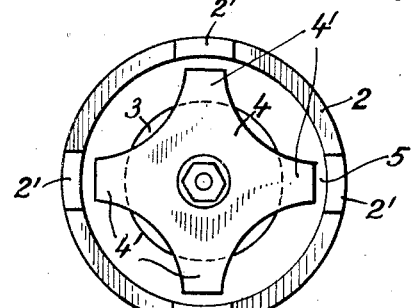
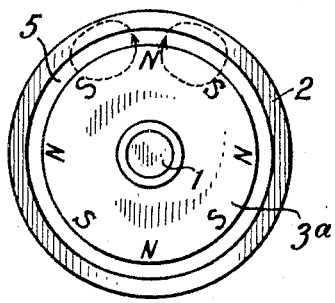
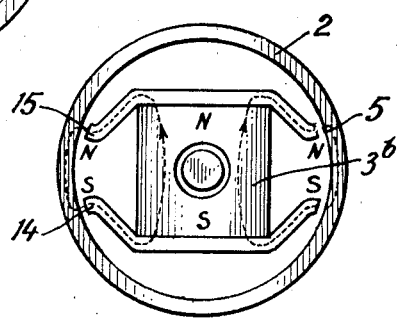
INVENTOR:
AUGUST DUWE
Attorney:

Nov. 18, 1941.  A. DUWE  2,263,264

MAGNETIC SYSTEM FOR MEASURING DEVICES

Filed Jan. 4, 1939   2 Sheets-Sheet 2

Inventor:
August Duwe,
Attorney:

Patented Nov. 18, 1941

2,263,264

UNITED STATES PATENT OFFICE 2,263,264

MAGNETIC SYSTEM FOR MEASURING DEVICES

August Duwe, Villingen, Schwarzwald, Germany, assignor to Kienzle Apparate A.-G., Villingen, Schwarzwald, Germany Application January 4, 1939, Serial No. 249,349
In Germany December 6, 1937

4 Claims. (Cl. 264—13)

The present invention relates to a magnetic system for devices adapted for measuring eddy currents or the like. The invention is concerned with magnetic speedometers of the type employing the torque induced by the relative rotation between a magnet and a non-magnetic conducting member due to eddy currents in the said member, for actuating a spring biased indicator for measuring the speed of a shaft or other means connected to cause relative rotation between the magnet and the conducting member or eddy current discs. In such devices the rotating field hitherto has been produced by an annular magnet provided with an air gap. By a shunt across this air gap a portion of the magnetic flux is so deviated as to flow through a drum, disc or the like consisting of copper or aluminium. This drum or disc is rotated due to the interaction between the rotating magnetic field and the eddy current field. In this type of construction flux is badly utilized so that the torque available at the drum, disc or the like is very small and in most cases is not even sufficient to overcome friction on the actuated elements caused by dirt or thickened oil. The devices, therefore, fail to operate or they indicate wrongly measured values.

According to the invention this drawback is obviated by the fact, that the magnetic body consists of a magnetic material of high coercive force and preferably is provided with conductive members of iron which have distinct pole projections. In this manner a powerful magnetic field may be utilized for the production of eddy currents and to cause the entire magnetic flux to flow through the member of the measuring device to be actuated, for instance a disc or drum consisting of aluminium, copper or the like so that such member is subjected to a strong torque. Due to the powerful torque acting upon this disc or drum, the latter may be made of a material having a low temperature coefficient. The temperature error or fault inherent to the known measuring devices, therefore, is nearly entirely removed. Hitherto the use of such material having a low temperature coefficient has been impossible due to the high specific resistance, as otherwise the torque, very small per se, would have been still further weakened.

According to the invention, furthermore, the magnetic body, consisting of a magnetic material having high coercive force, is provided with magnetically conductive members of iron projecting beyond one side of the magnetic body. Between the free ends of these conductive members of iron acting as pole projections an air gap remains in which the member of the measuring device to be actuated is traversed by the magnetic flux. This construction providing conductive members of iron projecting beyond one side of the magnetic body has the advantage in that the magnetic flux is concentrated on a point determined by the free ends of the conductive members of iron, thereby effecting economy and simplicity of manufacture.

Further features and advantages of the in invention will be apparent from the following description.

In the accompanying drawings various modifications of constructions according to the invention are shown by way of example.

In these drawings:

Fig. 1 shows a longitudinal section through a speedometer,

Fig. 2 is a plan view of the speedometer,

Figure 7:
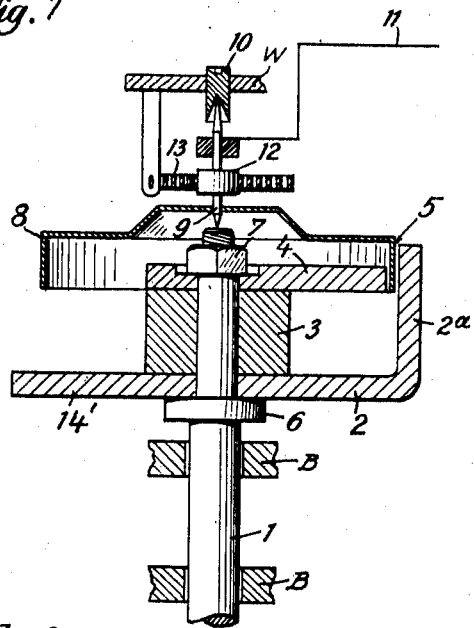

Figs. 3 and 4, Figs. 5 and 6 and Figs. 7 and 8 are sections and plan views respectively of further modified constructions of the speedometer according to the invention.

In the construction shown in Figs. 1 and 2 the shaft 1 which revolves in suitable casing bearings BB, carries a cup-shaped annular member 2 of soft iron in which is concentrically arranged a relatively thick circular disc 3 of magnetic material of high coercive force, for example of an iron-nickel-aluminium alloy. The said member 2 is nearly closed by a soft iron plate 4 resting upon the disc 3 so that an air gap 5 only remains between the upper edge of the member and the outer edge of the plate 4, thereby completing a magnetic circuit from the air gap 5, through plate 4, disc 3, radially and then upwardly through member 2 and back to the air gap 5. The member 2, the disc 3 and the plate 4 are firmly pressed against each other and safely supported upon the shaft 1 on the one hand by a collar 6 of this shaft and on the other hand by a nut 7 screwed upon the free end of the latter.

As may particularly be gathered from the plan shown in Fig. 2, the edge of the member 2 and the plate 4 are provided with pole projections 2' and 4' respectively. In this manner all the flux produced by the magnetic body, i. e. the disc 3, is concentrated upon the air gap 5 at the points of the oppositely arranged pole projections 2' and 4'.

Into this air gap 5 projects the lower edge of a cup-shaped annular drag member 8 made of aluminium, copper or the like or of a resistance material which is carried by a spindle 9. The latter on the one hand is rotatably mounted in the free end of the shaft 1 and on the other hand in a small bearing 10 or the like supported by a wall W of the casing of the measuring device. The spindle 9 carries the pointer 11 of the measuring device.

If the shaft 1 and the elements 2, 3 and 4 of the speedometer are rotated, the eddy current field produced by the rotating magnetic field exercises a torque or a directing force respectively upon drag member 8 so that the latter together with its spindle 9 and the pointer 11 is more or less displaced in accordance with the speed of rotation of the speedometer. Simultaneously a resilient return device 12, 13 for the member 8 is tensioned. According to the new arrangement the torque produced is strong enough to overcome frictional resistances due to thickened oil, dirt or the like. The inexactnesses of measurings produced hitherto, therefore, are obviated by the novel speedometer. The torque acting upon the member 8 is even so large that it is absolutely sufficient to also move a rack by means of a toothed wheel mounted upon the spindle 9. By the aid of this rack any other members of the measuring device may be displaced. Moreover, cams or the like also may eventually be provided upon the spindle 9. During rotation of the spindle, these cams may for instance be used for controlling contact members of optical or acoustical signalling devices. The described construction of the speedometer, furthermore, has the advantage that the individual elements thereof consist of ordinary iron- or magnetic bodies respectively. If it is at all necessary, the magnetic body may easily be taken to pieces and assembled again. As, moreover, all the members of the magnetic system are formed as rotary bodies and arranged concentrically to each other, a special balancing of the entire system is not required. Moreover, this construction has the advantage that only a very small amount of material is required for the purpose of obtaining a strong magnetic field torque.

According to the modification shown in Figs. 3 and 4, a magnetic body 3a consisting of a material of high coercive force is provided in the member 2 of soft iron. In this construction a cover disc is not provided as the extraordinary low permeability of the new iron-nickel-aluminium alloy allows the development of distinct poles in the magnetic body 3a itself without requiring special pole projections for this purpose. The polarity indicated in Fig. 4, therefore, can be impressed upon the cylindrical magnetic body 3a. The magnetic flux is closed above the edge of the member 2.

According to the modification shown in Figs. 5 and 6, a magnetic body 3b is used which is formed not as a cylinder but as a prism. In this case the magnet 3b, consisting of a material of high coercive force, carries two iron conductive members 14, 15 which act as pole projections and cause the magnetic flux to be led into the pot-like casing 2.

Figure 8:
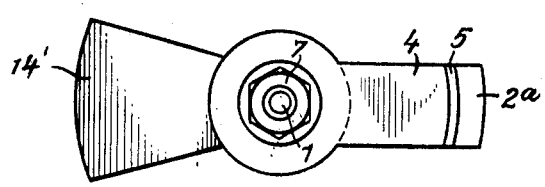

As shown in Figs. 7 and 8, the shaft 1 of this construction carries a rod-like lower conductive member 2 consisting of soft iron upon which is arranged concentrically with the shaft 1 a relatively thick magnetic body of a magnetic material of high coercive force, for example an iron-nickel-aluminium alloy. Upon the magnetic body 3 rests a conductive member 4 also consisting of soft iron. An air gap 5 remains between the free end of the upper conductive member 4 of iron and the upwardly bent end 2a of the lower conductive members 2. The two conductive members 2 and 4 and the magnetic body 3 are firmly pressed against each other and safely supported upon the shaft 1 on the one hand by a collar 6 of this shaft and on the other hand by a nut 7 screwed upon the free end of the latter.

In this construction the entire flux produced by the magnetic body 3 is concentrated upon the air gap at the ends of the two conductive members 2 and 4 of iron arranged opposite each other.

Into this air gap there projects the lower edge of a drag member 8 carried by a spindle 9 and consisting of aluminium, copper or the like or resistance material. The spindle 9 is rotatably mounted on the one hand in the free end of the shaft 1 and on the other hand in a small block 10 supported by a wall W of the casing of the measuring device. The spindle 9 carries the pointer 11 of the measuring device.

If the shaft 1 and the elements 2, 3 and 4 are rotated, the eddy current field produced by the rotating magnetic field exercises a torque or directing force respectively upon the drag member 8 so that the latter together with its spindle 9 and the pointer 11 is more or less displaced in accordance with the speed of rotation of the magnetic system. Simultaneously a resilient return device 12, 13 for the member 8 is tensioned. The torque produced is so strong that frictional resistances produced by thickened oil, dirt or the like are easily overcome. The inexactness of measuring due hitherto to these facts is, therefore, obviated when using this speedometer.

In the construction illustrated in Figs. 7 and 8, the lower conductive member 2 of iron carries, at its end arranged opposite to its pole projection 2a, a counter-weight 14' which is formed as an extension of the conductive member 2 of iron itself and which, as shown in Fig. 8, preferably is somewhat larger than the end of the conductive member of iron forming the pole projection 2a. In this manner the mass formed by the pole projection 2a of the conductive member 2 of iron is balanced so that a uniform and easy rotation of the magnetic system around the shaft 1 is accomplished.

Of course, the upper conductive member 4 of iron also may, if desired, be provided with such a counter-weight.

The described construction of the speedometer, furthermore, has the advantage that the individual elements may cheaply be made and easily be assembled, that for the various iron- or magnetic bodies respectively a small amount of material only is required and that the magnetic flux through the free ends of the conductive members 2 and 4 of iron arranged opposite each other and acting as pole projections is concentrated upon the air gap between these ends.

What I claim is:

1. In combination, a rotary shaft; a cup-shaped member of soft iron fast on said shaft coaxial therewith; the wall of the member being annular and having its upper edge formed into upwardly projecting pole projections, the walls including the pole projections having a height equal to about a third of its inner diameter; a thick cylindrical disk-shaped magnetic block of high coercive force fast on said bottom coaxial therewith and having a central opening receiving said shaft; a soft iron plate fast on said block with its top face in the plane of the top of the pole projections, and its periphery formed into poles respectively slightly spaced from said projections to form air gaps; said poles and said block being spaced respectively from the bottom and wall of the member a distance equal to about two-thirds of the inner height of the wall including the projections, thereby to avoid leakage; a bearing alined with the shaft; a pointer carrying spindle rotatably carried by and between said bearing and the top face of the shaft, whereby rotation of the shaft tends to overcome the drag of said bearing; a spring tending to hold the spindle in a rest position; and an inverted cup shaped drag member of thin non-magnetic metal fast on the spindle coaxial with the spindle and having an annular wall extending downwardly through said air gaps.

2. A speedometer comprising, in combination, a rotary shaft having an upper reduced end portion and an annular shoulder just below said end portion; a plate-like member of soft iron having a bottom part resting on said shoulder and having a mid-opening receiving said reduced end of a peripheral part the member being upturned and arcuate on the axis of the shaft and formed into a pole projection having a height about equal to a third of its longest diameter through the axis a thick cylindrical magnetic disk of high coercive force fast on said bottom part coaxial with the shaft and having a central opening receiving said reduced end, and having its periphery spaced from said wall; a soft iron plate fast on said disk with its top face near the plane of the top of the pole projection, and formed into a pole having a peripheral face slightly spaced from the inner face of said pole projection to form an air gap; a nut on the end of said reduced end portion tightly clamping the plate, a disk and said plate-like member together; said pole and said disk being spaced from said bottom part and said pole projection respectively distances approximately equal to about two-thirds the inner height of the pole projection, thereby to avoid leakage; a bearing alined with the shaft; a pointer-carrying spindle rotatably carried by and between said bearing and the top face of the rotary shaft, whereby rotation of the shaft tends to overcome the drag of said bearing; a spring tending to hold the spindle in a rest position; and an inverted cup shaped drag member of thin non-magnetic metal fast on the spindle coaxial with the spindle shaft and having a cylindrical wall extending downwardly through said air gap.

3. A speedometer comprising, in combination, a rotary shaft having an upper reduced end portion and an annular shoulder just below said end portion; a cup-shaped member of soft iron having its bottom fast on said shoulder and having a central opening receiving said reduced end; the wall of the member being annular and having at its highest part a height about equal to a third of its inner diameter; a thick magnetic block of high coercive force fast on said bottom and spaced from said wall and having a central opening receiving said reduced end; pole-forming means of plate-like soft iron secured fast on said disk with the top face thereof in the plant of the top of the highest part of the wall, said means being formed into four poles slightly spaced from said wall to form air gaps; said block being spaced from said wall a distance greater than half the maximum inner height of the wall, thereby to lessen leakage; a spindle rotatably mounted between said bearing and in engagement with the top face of the rotary shaft; and an inverted cup shaped drag member of non-magnetic metal fast on the spindle coaxial with the spindle and having an annular wall extending downwardly approximately through said air gap.

4. A speedometer comprising, in combination, a rotary shaft having an upper reduced end portion and an annular shoulder just below said end portion; a cup-shaped member of soft iron having its bottom fast on said shoulder and having a central opening receiving said reduced end; the wall of the member being annular and free of inward projections and having at its highest part a height about equal to a third of its inner diameter; a thick mass of magnetic flux conductive material within the cup-shaped member and including a cylindrical magnetic disk of high coercive force fast on said bottom coaxial therewith and free of polar projections and having a central opening receiving said reduced end, and having its periphery spaced from said wall; a peripheral part of said mass being slightly spaced from said wall to form an air gap; a spindle rotatably mounted in engagement with the top face of the rotary shaft; and an inverted cup-shaped drag member of non-magnetic metal fast on the spindle coaxial with the spindle and having an annular wall extending downwardly approximately through said air gap.

AUGUST DUWE.